BINARY FLIP-FLOP ELEMENT FOR
PNEUMATIC DIGITAL COMPUTER
Filed June 4, 1962

FRANK SAMET
INVENTOR.

BY S. A. Giarratana

ATTORNEYS

United States Patent Office 3,168,898

Patented Feb. 9, 1965

3,168,898

BINARY FLIP-FLOP ELEMENT FOR PNEUMATIC DIGITAL COMPUTER

Frank Samet, New York, N.Y., assignor to General Precision Inc., Little Falls, N.J., a corporation of Delaware Filed June 4, 1962, Ser. No. 199,671
6 Claims. (Cl. 137—119)

This invention relates to pneumatic digital computer elements and circuits used in conjunction therewith, and is particularly directed to a digital computer element which is used as a binary flip-flop.

The primary feature of the invention is that a single bistable element actuated by negative pulses or openings is utilized as a flip-flop.

This invention represents an improvement on a copending application, Serial No. 113,911, now abandoned, filed in the United States Patent Office on the 31st day of May 1961, by Hugh E. Riordan, directed to a "Pneumatic Computer Element," and assigned to the same assignee as the present invention.

This invention is directed primarily to computer elements used in hot gas systems, in which gas at high temperatures and relatively high pressures is utilized.

A primary feature of the construction is that the computer element is relatively small, compact, and in which the fit between the ball or piston and the cylinder in which it is reciprocatively mounted, while fairly close, still provides some clearance so that a certain amount of leakage is provided past the piston or reciprocative ball within the cylinder in which the ball or piston is operated.

In general, most digital computer functions can be performed by circuits employing appropriate combinations of binary flip-flops and other elements.

A flip-flop element such as that provided by applicant has the property of changing its state, and hence its polarity or the level of its output upon successive application of input signals. In this manner, the flip-flop element can perform a wide range of digital computer operations, such as counting, switching, and memory.

In applicant's flip-flop element, input signals are supplied by negative pulses or momentary input lead openings.

Another feature is that the operation of the computer element is controlled by negative pulses or by openings in combination with restricted passages or orifices through the system.

Another object of the present invention is the provision of a pneumatic computer element applicable for use in a hot gas operated guidance and control system requiring high temperature capabilities and having high response speed and accuracy requirements.

Another object is to provide a pneumatic computer element and a circuit used in conjunction therewith, which are capable of performing basic digital functions.

A further object of the invention is the provision of a pneumatic computer element and a circuit therefor, the computer element having a number of operational stable positions enabling the device to perform a wide range of digital computation functions.

Other objects and many of the attendant advantages of this invention will be readily appreciated as the same becomes better understood by reference to the following detailed description when considered in connection with the accompanying drawings.

Figure 1:
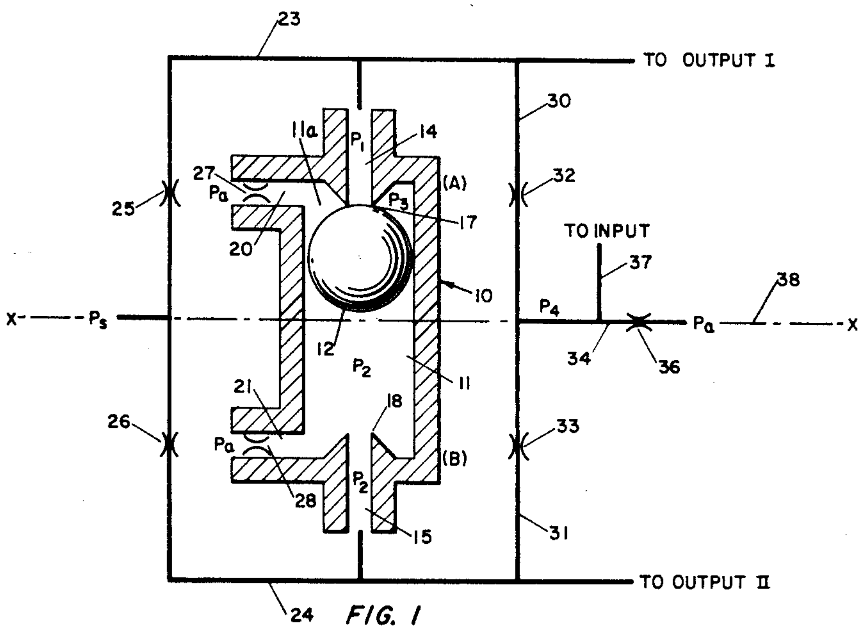
FIGURE 1 is a schematic longitudinal sectional view through a preferred embodiment of the bistable element, and the circuit used in conjunction therewith, including a plurality of restriction orifices, connected to the element.

It will be understood that the following description of the construction and the method of connection, control, operation, and utilization of the pneumatic computer element and circuit therefor is intended as explanatory of the invention and not restrictive thereof.

In the drawings, the same reference numerals designate the same parts throughout the various views, except where otherwise indicated.

One embodiment of the gas-controlled computer element shown in FIGURE 1 comprises enclosure means such as a body 10, having a substantially cylindrical cavity 11 formed in the interior thereof, and a valve member taking the form of a spherical ball 12 slidably fitted to the cavity 11.

The body 10 of the computer element has four tubular connections formed therein, including two axial passages or connections 14, 15, each of which has an integral ball seat 17, 18 formed therein, the ball seats protruding into the central cavity, and two side passages 20, 21, one of which is located near one of the axial passages 14, 15, the other being located near the second axial passage 15. The side passages 20, 21 are located near the ball seats 17, 18 of the axially aligned passages 14, 15.

Each of the side passages 20, 21 is open to the atmosphere through the flow restrictions 27 and 28, which are inserted in each of the side passages 20, 21.

Since the ball 12 is not tightly fitted to the cavity 11, a small predetermined portion of the gas flowing through the axial passage 15, passes through the cavity 11, around the ball 12 and out through the side passage 20, in the ball position shown in FIGURE 1.

Figure 2:
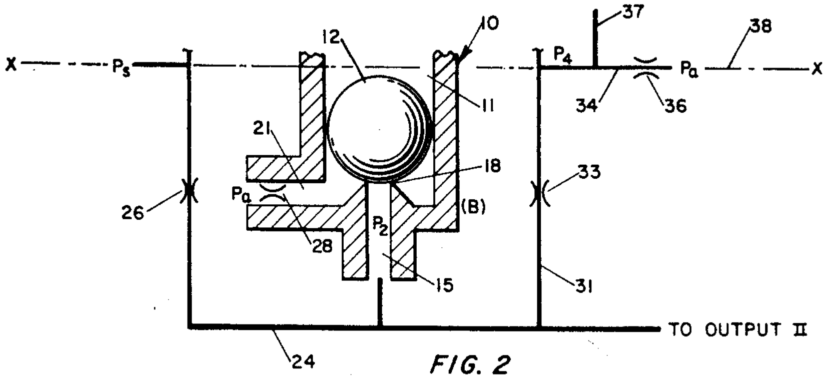
FIGURE 2 is a schematic longitudinal section, similar to FIGURE 1, through a portion of the computer element shown in FIGURE 1, showing the ball transferred to the second stable position.

The two stable positions of the ball, adjacent the ball seats 17, 18 are designated A and B, in FIGURES 1 and 2, each representing the position of the ball when in contact with one of the ball seats. A suitable gas supply is provided at $P_s$, the gas flowing through a pair of lines 23, 24, each of which has a suitably designed flow restrictive orifice 25, 26 therein leading to the two axially aligned connections 14, 15 in the body of the element.

$P_1$ designates the gas pressure at one of the axially aligned connections 14 and $P_2$ the gas pressure at the second axially aligned connection 15 and in the adjacent cylinder cavity 11.

$P_3$ designates the gas pressure against the ball surface within a portion 11*a* of the cylindrical cavity 11, between the outer circumference of the ball seat, and the inner circumference of the upper portion of the cavity.

The pressure in the portion of the cavity 11, below the ball is greater than that in the portion 11*a* above the ball 12.

In stable position A, the ball is seated against the seat 17 terminating the axial connection 14. In the position B, shown in FIGURE 2, the ball is seated on the seat 18 terminating the second axial connection 15.

The leads 23, 24 are connected to leads 30, 31, respectively, each of which has a restriction 32, 33 inserted therein, the two leads 30, 31 merging into outlet line 34 which is open to the atmosphere, through an outlet flow restriction 36 which is incorporated therein.

A line 37 is connected from the input signal source to the line 34 on the upstream side of restriction 36 and is normally closed.

Output sensing devices or subsequent computer stages are connected to the portion of the circuit designated Output I which is located between the two restrictive orifices 25 and 32, and to the other portion of the circuit designated Output II which is located between the two restrictive orifices 26 and 33, in the opposite half of the element, respectively. Pressure differentials occur at these output positions as a result of input signals as will hereinafter be described in greater detail.

The body 10 of the element is generally symmetrical about the horizontal axis 38 shown in FIGURE 1, so that the length and cross-section of the leads, and the diameter and length of the restrictive orifices located above and below the axis are substantially identical.

Thus axial connections 14 and 15 are equal in diameter and length.

This also applies to the restrictive orifices 25 and 26, incorporated in the lines 23, 24.

The dimensions of some of the restrictive orifices such as 25, 26, 32, and 33 are determined with consideration for the fact that when "critical flow" occurs through an orifice (i.e., when flow velocity of the gas is at or above the speed of sound transmission in the gas) pressure fluctuations occurring downstream of the orifice cannot be propagated in an upstream direction through the orifice. Critical flow occurs when the ratio of pressure on the downstream side of the orifice to pressure on the upstream side is below a critical value K which is a characteristic of a gas (e.g., $K=0.53$ for air). The propagation of pressure fluctuations in a downstream direction is independent of whether the flow through the orifice is critical or subcritical.

In the construction shown in FIGURES 1 and 2, restrictions 25 and 26 in the gas supply lines, and outlet restriction 36 in line 34 are designed for critical flow at all times. Restrictions 32 and 33 located on opposite sides of the center are designed for critical flow under certain conditions and subcritical flow under others, for reasons hereinafter described in greater detail.

FIGURE 1 shows one of the two states of the flip-flop element 10, with the ball 12 in position A, seated against the seat 17, thereby closing axial connection 14.

In order to maintain the ball in the position shown in FIGURE 1, the upward forces exerted on the ball by the gas pressure in the lower portion of the cavity 11 must be greater than the downward forces exerted by the combined pressures $P_1$ acting on the spherical segmental area of the ball in contact with $P_1$ and pressure $P_3$ in the upper portion 11 of the cylindrical cavity acting on the remaining portion of the hemispherical segment of the ball, beyond the seat, in contact with $P_3$.

If M is the area of the projection of the ball, and N the area of the projection of the spherical segment in contact with $P_1$, the condition illustrated by FIGURE 1 is maintained, when $$P_2M>[P_1(N)+P_3(M-N)] \quad (1)$$

The actual area of the circumferential seat 17 and the weight of the ball both of which are relatively small, have been neglected in the above equation.

It can be seen from the above equation, that if a substantial drop occurs in the pressure $P_2$ in the lower portion of the cavity 11, while the upper pressures $P_1$ and $P_3$ remain substantially constant, the direction of the pressure differential maintaining the ball in position A, shown in FIGURE 1, would be reversed and the ball 12 would be moved downward against the seat 18 into the position shown in FIGURE 2, thus reversing the state of the element.

Flow and pressure conditions in the element condition shown in FIGURE 1, before a subsequent control signal is applied, are as follows:

$P_1$, the pressure at the axial connection 14 between the restrictions 25 and 32 is smaller than $0.53P_s$ because the restriction orifice 25 is critical at all times.

$P_4$, the pressure in the section of the circuit between the three right-hand restrictions 32, 33, and 36, is smaller than $0.53P_1$ and therefore orifice 32 is critical under the stated conditions.

$P_2<P_1$, because in addition to the gas flow through restriction orifices 33 and 36, which is equivalent to 32 and 36, the fluid passing through the axial connection 15 has two additional outlets. These include side outlet 21 which is open to the atmosphere, and the upper side outlet 20, which the fluid reaches after it passes the restriction between the ball 12 and the inner surface of the cavity 11.

$P_2$ can be made sufficiently low, compared to $P_1$, so that the ratio $P_4/P_2$ and the restriction orifice 33 are no longer critical. In this way pressure fluctuations beyond restriction orifice 33 will be propagated back to $P_2$ through axial connection 15.

$P_3<P_2$ in the state illustrated in FIGURE 1, with the ball in position A, since the condition $P_a<P_3<P_2$, where $P_a$ is the atmospheric pressure must prevail, in order to maintain the position of the ball.

When a negative pulse of predetermined amplitude and duration is applied to input lead 37, it cannot be transmitted to $P_1$ through the restriction 32, because $P_4/P_1$ is critical at the beginning and even more so after the start of the signal pulse. It will however definitely be transmitted to $P_2$ through lower restriction orifice 33 because $P_4/P_2$ is subcritical and remains subcritical even after the pulse has been initiated.

As a result a drop in pressure $P_2$ occurs in the lower portion of cavity 11; $P_3$ cannot be reduced immediately because of the small clearance between the ball and the interior of the cavity 11.

The equilibrium conditions expressed by the Equation 1 are disturbed and the ball is driven from the upper seat 17 to the lower seat 18, shown in FIGURE 2.

Since upper axial connection 14 is now open and the lower axial connection 15 closed, Output I from lead 23 senses a pressure drop, and Output II senses a pressure rise. Successive input signals will cause each time a succession of pressure drops and rises in each of the two outputs; a rise in one output will be accompanied by a drop in the other output.

It is thus apparent that each of the two Outputs I and II can be used separately to actuate a binary device, as for example, a binary counter.

It will be apparent to those skilled in the art, that the present invention is not limited to the specific details described above and shown in the drawings, and that various modifications are possible in carrying out the features of the invention and the operation and the method of support, mounting, adjustment, and utilization thereof, without departing from the spirit and scope of the appended claims.

What I claim is:

1. In combination with a bistable pneumatic element including a valve member shiftable between two stable, passage-closing positions by means of pressure changes at the respective outlets of the passages controlled by the valve member, a pneumatic circuit comprising:

- a pair of parallel branches having common inlet and outlet portions;
- respective, identical, flow restrictions in said branches adapted to produce critical flow under all operating conditions of the circuit;
- additional, respective, identical flow restrictions in said parallel branches downstream of the first-mentioned flow restrictions adapted selectively to produce critical and subcritical flow depending on operating conditions of the circuit;
- respective flow connections between said passages and said parallel branches at respective points between the flow restrictions therein;
- respective output pressure signal connections to said parallel branches at respective locations intermediate the downstream flow restriction and flow connection point of the corresponding passage; and
- an input pressure signal connection to said common outlet portion.

2. A pneumatic circuit according to claim 1 including a flow restriction in said common outlet portion located downstream of said input pressure signal connection and adapted to produce critical flow under all operating conditions of the circuit.

3. A pneumatic circuit comprising, in combination, a bistable pneumatic element and flow conduit means for connecting said element between a source of gas under pressure and regions of lower pressure, said bistable element comprising:

enclosure means defining a cavity having end walls and sidewalls, said end walls containing respective passages in communication with said cavity;

means defining respective, coaxially aligned valve seats circumscribing the inner ends of said end wall passages;

a valve member, adapted alternately to seat on each of said valve seats and close the corresponding passage, conforming in cross-sectional contour to said cavity and disposed therein for reciprocative movement between limit positions defined by engagement of the valve member with said valve seats, the cross-section of the valve member being proportioned relative to the cavity cross-section so as to define a peripheral clearance space therebetween, said end walls and sidewalls coacting with said valve member at the limits of reciprocation to enclose respective portions of said cavity adjacent the end walls, said cavity portions being completely partitioned from the remainder of the cavity except for flow communication through said peripheral clearance space; and means defining respective additional passages in said enclosure means continuously open to said cavity portions;

said flow conduit means including:

a pair of parallel branches having common inlet and outlet portions;

respective, identical, flow restrictions in said branches adapted to produce critical flow under all operating conditions of the circuit;

additional, respective, identical flow restrictions in said parallel branches downstream of the first-mentioned flow restrictions adapted selectively to produce critical and subcritical flow depending on operating conditions of the circuit;

respective flow connections between said end wall passages and said parallel branches at respective points between the flow restrictions therein;

respective output pressure signal connections to said parallel branches at respective locations intermediate the downstream flow restriction and flow connection point of the corresponding end wall passage; and an input pressure signal connection to said common outlet portion.

4. A pneumatic circuit according to claim 3 including a flow restriction in said common outlet portion located downstream of said input pressure signal connection and adapted to produce critical flow under all operating conditions of the circuit.

5. A pneumatic circuit comprising, in combination, a bistable pneumatic element and flow conduit means for connecting said element between a source of gas under pressure and regions of lower pressure, said bistable element comprising:

enclosure means defining a cavity having end walls and sidewalls, said end walls containing respective passages in communication with said cavity;

means defining respective, coaxially aligned valve seats circumscribing the inner ends of said end wall passages;

a valve member, adapted alternately to seat on each of said valve seats and close the corresponding passage, conforming in cross-sectional contour to said cavity and disposed therein for reciprocative movement between limit positions defined by engagement of the valve member with said valve seats, the cross-section of the valve member being proportioned relative to the cavity cross-section so as to define a peripheral clearance space therebetween, said end walls and sidewalls coacting with said valve member at the limits of reciprocation to enclose respective portions of said cavity adjacent the end walls, said cavity portions being completely partitioned from the remainder of the cavity except for flow communication through said peripheral clearance space; and means defining respective additional passages in said enclosure means continuously open to said cavity portions;

said flow conduit means including:

a pair of parallel branches having common inlet and outlet portions;

respective, identical, flow restrictions in said branches adapted to produce critical flow under all operating conditions of the circuit;

additional, respective, identical flow restrictions in said parallel branches downstream of the first-mentioned flow restrictions adapted selectively to produce critical and subcritical flow depending on operating conditions of the circuit;

an outlet flow restriction in the common outlet portion of said branches adapted to produce critical flow under all operating conditions of the circuit;

respective flow connections between said end wall passages and said parallel branches at respective points between the flow restrictions therein;

respective output pressure signal connections to said parallel branches at respective locations intermediate the downstream flow restriction and flow connection point of the corresponding end wall passage; and an input pressure signal connection to said common outlet portion on the upstream side of said outlet flow restriction.

6. A pneumatic circuit comprising, in combination, a bistable pneumatic element and flow conduit means for connecting said element between a source of gas under pressure and regions of lower pressure, said bistable element comprising:

enclosure means defining a cylindrical cavity having end walls containing respective coaxial flow passages therethrough;

means defining respective, coaxial, inwardly projecting valve seats circumscribing the inner ends of said end wall passages;

a spherical valve member disposed within said cavity, with a predetermined small peripheral clearance, for reciprocative movement between limit positions defined by closing engagement of the valve member with the valve seats, the end walls and sidewalls of the cavity coacting with the valve member at said limit positions to enclose respective portions of the cavity, adjacent the end walls, completely partitioned from the remainder of the cavity except for flow communication through said peripheral clearance space; and means defining respective additional passages in said enclosure means continuously open to said cavity portions;

said flow conduit means including:

a pair of parallel branches having common inlet and outlet portions;

respective, identical, flow restrictions in said branches adapted to produce critical flow under all operating conditions of the circuit;

additional, respective, identical flow restrictions in said parallel branches downstream of the first-mentioned flow restrictions adapted selectively to produce critical and subcritical flow depending on operating conditions of the circuit;

an outlet flow restriction in the common outlet portion of said branches adapted to produce critical flow under all operating conditions of the circuit;

respective flow connections between said end wall passages and said parallel branches at respective points between the flow restrictions therein;

respective output pressure signal connections to said parallel branches at respective locations intermediate the downstream flow restriction and flow connection point of the corresponding end wall passage; and an input pressure signal connection to said common outlet portion on the upstream side of said outlet flow restriction.

References Cited in the file of this patent

Computing With Air; Machine Design, June 8, 1961, pages 24–48.